United States Patent
Toriumi et al.

(10) Patent No.: US 10,848,679 B2
(45) Date of Patent: Nov. 24, 2020

(54) OPTICAL APPARATUS

(71) Applicant: CANON KABUSHIKI KAISHA, Tokyo (JP)

(72) Inventors: Hiroshi Toriumi, Yokohama (JP); Yosuke Fukai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/228,265

(22) Filed: Dec. 20, 2018

(65) Prior Publication Data
US 2019/0208134 A1    Jul. 4, 2019

(30) Foreign Application Priority Data

Dec. 28, 2017 (JP) ................. 2017-254238

(51) Int. Cl.
*H04N 5/232* (2006.01)
*G03B 13/00* (2006.01)
*H04N 5/225* (2006.01)
*G08B 21/18* (2006.01)

(52) U.S. Cl.
CPC ..... *H04N 5/232939* (2018.08); *G08B 21/182* (2013.01); *H04N 5/225251* (2018.08); *H04N 5/232122* (2018.08); *H04N 5/232123* (2018.08)

(58) Field of Classification Search
CPC ....... H04N 5/232939; H04N 5/232123; H04N 5/232122; H04N 5/23212; H04N 5/2254; H04N 5/225251; H04N 5/22525
See application file for complete search history.

(56) References Cited

U.S. PATENT DOCUMENTS

| 5,752,094 | A | * | 5/1998 | Tsutsumi | G02B 7/102 396/52 |
| 2012/0328277 | A1 | * | 12/2012 | Nakata | G03B 3/10 396/131 |
| 2016/0065941 | A1 | * | 3/2016 | Oniki | H04N 13/239 348/47 |
| 2018/0109722 | A1 | * | 4/2018 | Laroia | H04N 5/23216 |
| 2018/0220076 | A1 | * | 8/2018 | Kamiya | H04N 5/23209 |

FOREIGN PATENT DOCUMENTS

JP     2002-23243 A    1/2002

* cited by examiner

*Primary Examiner* — Kelly L Jerabek
(74) *Attorney, Agent, or Firm* — Canon U.S.A., Inc. IP Division

(57) ABSTRACT

An optical apparatus includes an image-forming optical system with a changeable focal length, an image pickup device configured to capture an image formed by the image-forming optical system and to output an image signal, and at least one processor or circuit programmed to function as a display control unit configured to control a display unit configured to display an image based on the image signal and a notification control unit configured to control a notification unit provided separately from the display unit and configured to notify a user of information regarding the focal length of the image-forming optical system. The notification control unit causes a notification method of information regarding the focal length by the notification unit to be changed based on the focal length.

14 Claims, 8 Drawing Sheets

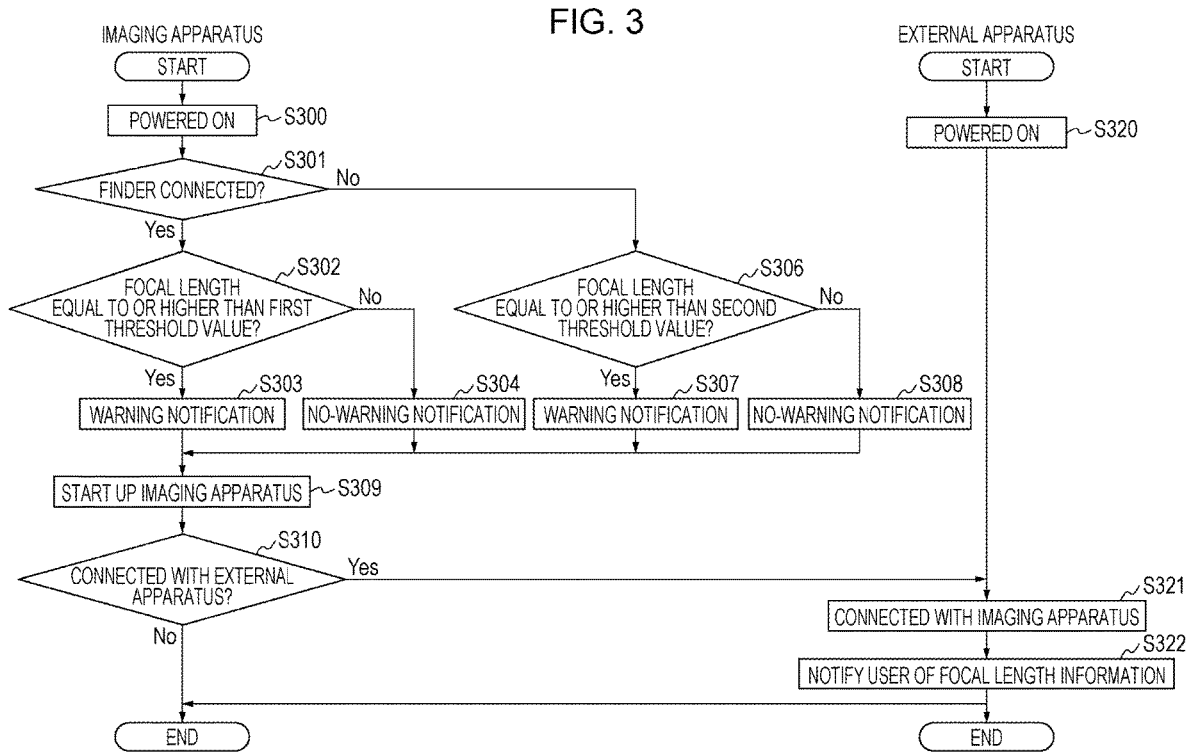

GREEN LIGHTS UP

RED BLINKING

GREEN LIGHTS UP

RED BLINKING

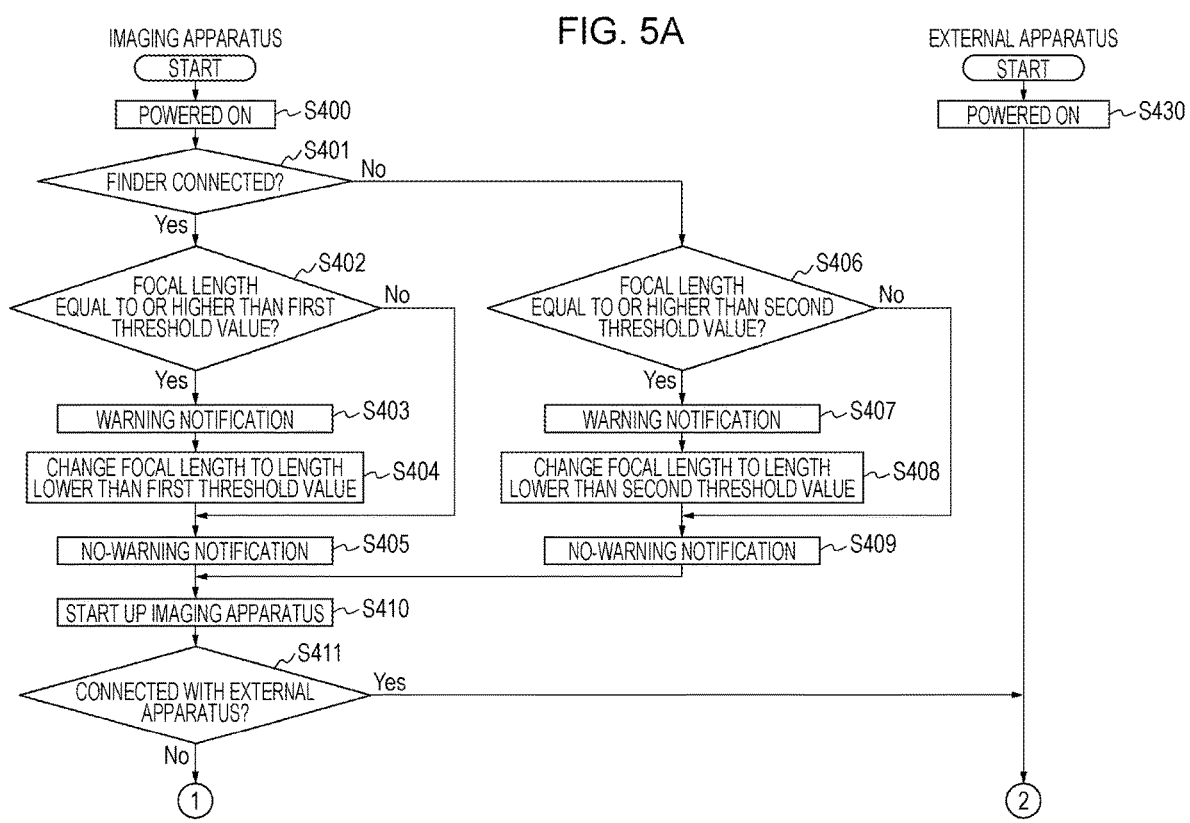

OPTICAL APPARATUS

BACKGROUND

Field of the Disclosure

The present disclosure relates to an optical apparatus including an optical system.

Description of the Related Art

Various optical apparatuses each including an optical system have been proposed in relation to a user interface for a digital camera. For example, in order to prevent a failure in photographing due to a camera shake, a digital camera has been proposed which gives a camera shake warning based on a focal length and a shutter speed.

Japanese Patent Laid-Open No. 2002-23243 discloses an imaging apparatus which gives a camera shake warning based on a focal length and a shutter speed, in which a warning display is presented in accordance with the condition that a camera shake warning is hardly to be given if a focal length is equal to or higher than a predetermined value. This can solve a problem that setting a longer focal length results in frequent warnings.

SUMMARY OF THE INVENTION

According to an aspect of the present invention, an optical apparatus includes an image-forming optical system with a changeable focal length, an image pickup device configured to capture an image formed by the image-forming optical system and to output an image signal, and at least one processor or circuit programmed to function as a display control unit configured to control a display unit configured to display an image based on the image signal and a notification control unit configured to control a notification unit provided separately from the display unit and configured to notify a user of information regarding the focal length of the image-forming optical system. The notification control unit causes a notification method of information regarding the focal length by the notification unit to be changed based on the focal length.

Further features of the present invention will become apparent from the following description of exemplary embodiments with reference to the attached drawings.

BRIEF DESCRIPTION OF THE DRAWINGS

FIG. 3 is a flowchart according to Embodiment 1 of the present invention.

FIGS. 5A and 5B illustrate a flowchart according to Embodiment 2 of the present invention.

DESCRIPTION OF THE EMBODIMENTS

Figure 1A:
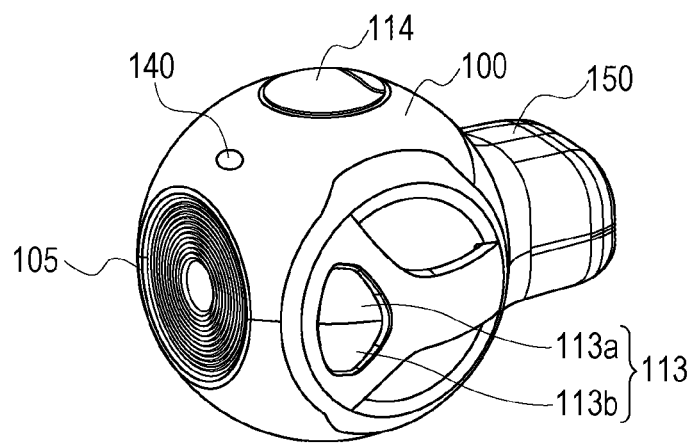
FIGS. 1A to 1C illustrate outer appearances of an imaging apparatus and an electric viewfinder according to Embodiments 1 to 3 of the present invention.

Preferred embodiments of the present invention will be described below with reference to the attached drawings. Like numbers refer to like parts in the drawings, and any repetitive descriptions will be omitted.

According to Embodiments 1 to 3, as an optical apparatus including an image-forming optical system enabling selection of one of a plurality of different focal lengths, an imaging apparatus will be described which includes an image-forming optical system and an image pickup device configured to perform photoelectric conversion on light entering through the image-forming optical system. However, the present invention is also applicable to a lens unit without an image pickup device, for example.

Embodiment 1

An imaging apparatus according to Embodiment 1 is configured to notify a user of information regarding a focal length upon powered on and to change the notification method based on the focal length when powered on. Also, an electronic viewfinder is detachably attached to the imaging apparatus. When the electronic viewfinder is attached, the notification method is changed based on whether the focal length is equal to or higher than or lower than a first threshold value. When the electronic viewfinder is not attached, the notification method is changed based on whether the focal length is equal to or higher than or lower than a second threshold value. Assume that the first threshold value is higher than the second threshold value.

Embodiment 1 will be described below with reference to FIGS. 1A to 4H.

Figure 1B:
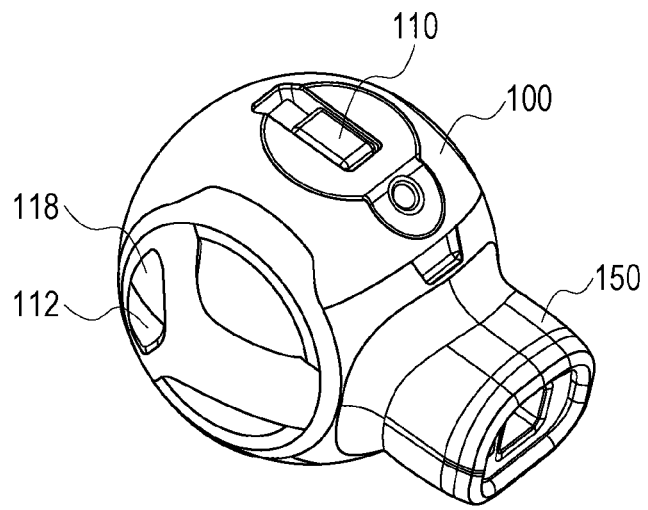
Figure 1C:
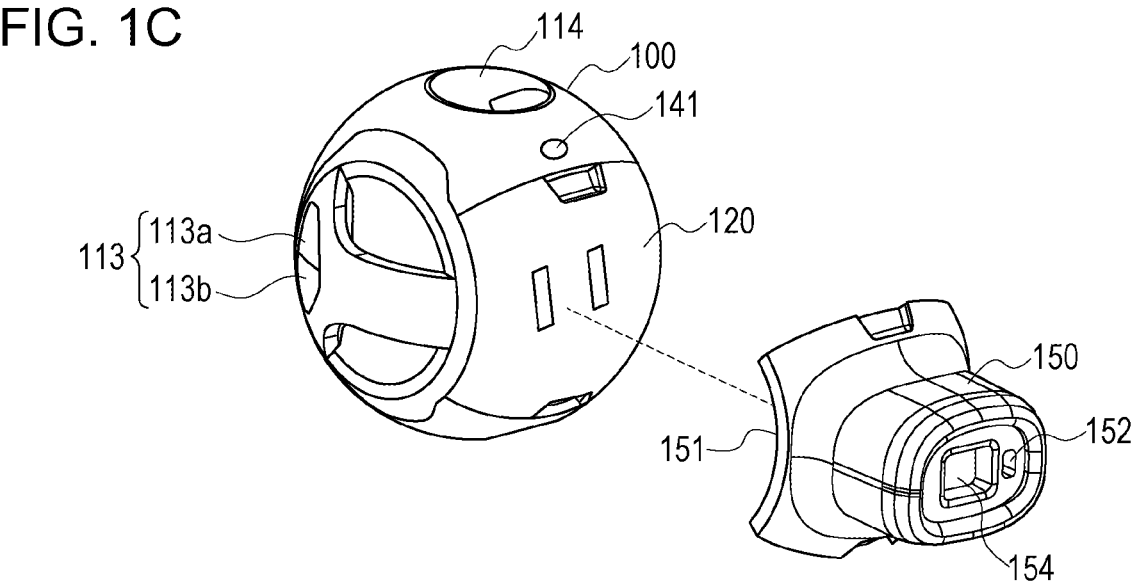

FIGS. 1A to 1C illustrate outer appearances of an imaging apparatus according to this embodiment. FIG. 1A is a perspective view of an imaging apparatus 100, viewed from a front side thereof. FIG. 1B illustrates the imaging apparatus 100 in FIG. 1A vertically reversed and viewed from a rear side thereof. FIG. 1C is a perspective view illustrating the imaging apparatus 100 and an electronic viewfinder (hereinafter, EVF) detached therefrom, viewed from the rear side thereof.

The imaging apparatus 100 includes an image-forming optical system 105, various operating switches, a connector 110 for connection with an external apparatus, a connector 120 for connection with an EVF 150, the connector 120 being disposed opposite to the image-forming optical system 105, and first and second notification units 140 and 141 configured to notify a user of information indicating a focal length. The imaging apparatus 100 includes, as operating switches, a power switch 112 configured to give an instruction to turn on/off a power supply, a zoom switch 113 configured to give an instruct to switch the focal length, a release switch 114 configured to give an instruction to image-capture, and a mode switch 118 configured to give an instruction to switch a mode. It should be noted that a stand may be provided which is to be used for mounting the imaging apparatus 100 thereon for fixed-point photography.

The EVF 150 includes a connector 151 for connection with the imaging apparatus 100, a display unit 154 configured to display an image based on a display signal input from the imaging apparatus 100, and an eye approach detecting unit 152 configured to detect whether a user is looking into the display unit 154. It should be noted that the simple term "image" refers to both a still image and a moving image in the present invention and throughout the specification.

Figure 2:
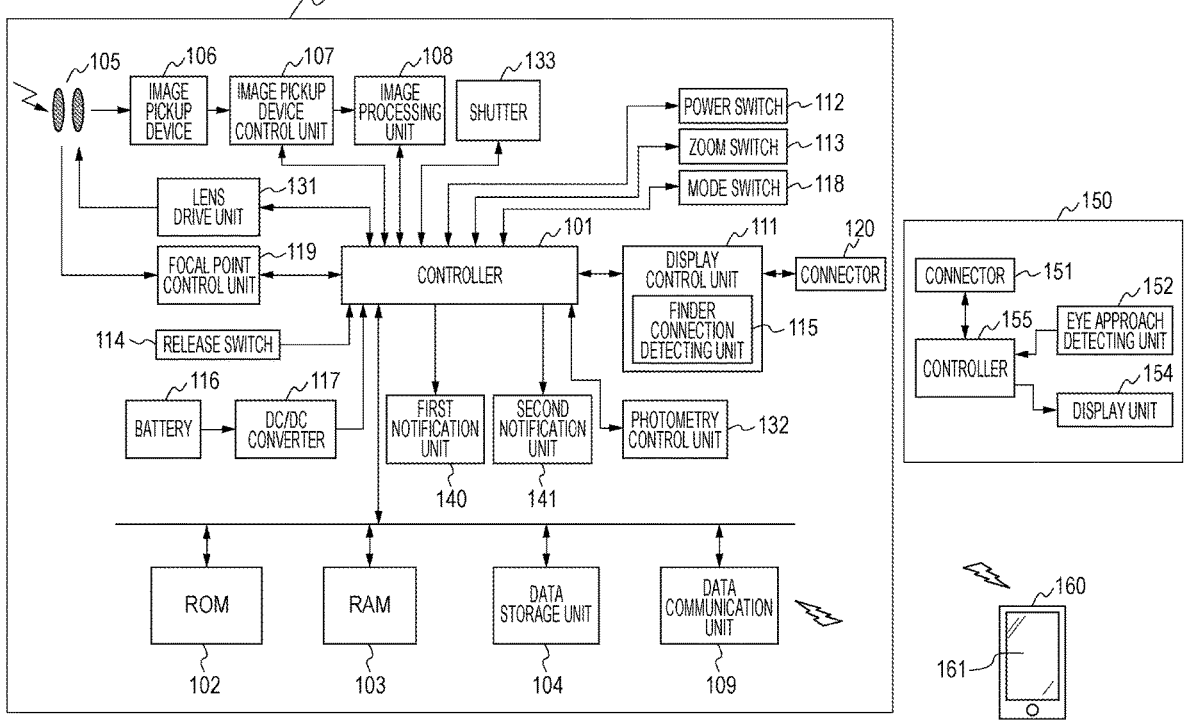
FIG. 2 is a block diagram illustrating the imaging apparatus and the electronic viewfinder according to Embodiments 1 to 3 of the present invention.

FIG. 2 is a block diagram illustrating inner configurations of the imaging apparatus 100 and EVF 150 according to this embodiment.

A controller (central processing unit) 101 is a control unit configured to control operations performed by the imaging apparatus 100. A read only memory (ROM) 102 storing control programs and a RAM (random access memory) 103 are each connected to the controller 101. A data storage unit 104, a data communication unit 109, an image processing unit 108, a display control unit 111, the release switch 114, a DC/DC converter 117 and so on are also each connected to the controller 101. The controller 101 is configured to perform controls based on the control programs within the ROM 102. Some of the controls may include a process for reading an image signal output from the image processing unit 108 and transferring it to the RAM 103. Controls performed by the controller 101 may further include a process for transferring data from the RAM 103 to the display control unit 111 and a process for performing JPEG compression on image data and storing it in a file format in the data storage unit 104. Moving image data may undergo similar processes, be compressed to a file in a MOV format and be stored in the data storage unit 104.

The controller 101 is further configured to instruct an image pickup device 106, an image pickup device control unit 107, the image processing unit 108 and the display control unit 111 to change their data acquisition ranges or the digital image process performed by them. The controller 101 is capable of a subject detection, a face recognition, and color recognition based on a luminance signal for image sensing field and a color signal acquired from an image signal output from the image pickup device 106 and of determining the captured scene, for example, determining whether the subject is a human figure or not. Although the controller 101 is configured by a processor according to this embodiment, part or all of its functions can be configured by a circuit.

The image-forming optical system 105 causes light from a subject to form an image on the image pickup device 106. Although the image-forming optical system 105 is represented by two lenses for convenience of illustration in FIG. 2, the number of lenses is not particularly limited thereto.

The image pickup device 106 is a sensor configured to perform photoelectric conversion on light from the image-forming optical system 105 and output an image signal and may be a CMOS sensor or a CCD sensor, for example. A signal acquired by the photoelectric conversion by the image pickup device 106 and a signal acquired by performing a conversion process and an image process on the signal are collectively called an image signal, unless otherwise noted in the present invention and throughout the specification.

The image pickup device control unit 107 is configured to control imaging by the image pickup device 106 and includes a timing generator for supplying a transfer clock signal and a shutter signal to the image pickup device 106 and a circuit configured to perform noise reduction and gain processes on an output signal from the image pickup device 106. The image pickup device control unit 107 further includes an A/D converting circuit configured to convert an analog signal to a 10-bit digital signal, for example. The 10-bit digital signal corresponds to the bit count for obtaining and quantizing image information. The bit count can vary in accordance with the specifications of the image pickup device 106. The image pickup device control unit 107 further includes a circuit configured to perform a pixel thinning process in response to a resolution conversion instruction from the controller 101 so that an image based on an image signal from the image pickup device 106 can be displayed on the display unit 154 of the EVF 150 and that moving image shooting can be performed.

A focal point control unit 119 is configured to control automatic focusing (auto-focus) and to detect focal positions in a plurality of regions within an imaging range in accordance with an existing focal position detection method such as contrast AF or image-plane phase difference AF. For example, an image signal is acquired through the controller 101, and how much the lens is to be driven from the current position for focusing (or whether the lens at the current position is in focus) may be calculated based on the image signal, and the drive amount may be designated to a lens drive unit 131. In accordance with contrast AF, image signals are acquired while the focus is being moved. A position where the acquired image signal has a relative maximum contrast is regarded as an in-focus position. In accordance with the image-plane phase difference AF, a pair of focus detection signals having a parallax is acquired from acquired image signals, and correlation computation is performed thereon to detect an in-focus position. It should be noted that phase difference AF using a two-dimensional image-forming lens and a dedicated sensor may be used instead of the focal position detection using image signals.

The lens drive unit 131 changes the position of a specific lens within the image-forming optical system 105 in accordance with the drive amount designated by the focal point control unit 119 through the controller 101 to perform a focusing operation. The method for focusing is not limited to the lens driving. The same effect can be acquired by changing the relative positions between the image pickup device 106 and the entire image-forming optical system 105. Therefore, the position of the image pickup device 106 can be changed. In this case, for example, the image pickup device 106 may be moved back or forth along the optical axis of the image-forming optical system 105.

The RAM 103 has an image unfolding area, a work area, a VRAM, and a temporarily saving area, not illustrated, for example. The image unfolding area is used as a temporary buffer for temporarily storing a captured image (YUV digital signal) transmitted from the image processing unit 108 or a JPEG compressed image data read out from the data storage unit 104. The image unfolding area may further be used as a work area exclusively for images for an image compression process or a decompression process.

The work area is to be used by various programs. The VRAM may be used for storing display data to be displayed on a display unit. The temporary saving area may be used for temporarily saving various data.

The data storage unit 104 is a flash memory for storing in a file format, a captured image data which is JPEG compressed by the controller 101 or storing moving image data in a MOV format. The image pickup device 106 can output pixel data thinned in a horizontal direction and a vertical direction in accordance with a resolution conversion instruction from the controller 101.

The release switch 114 is an operating member for receiving an instruction to start a shooting operation. When the release switch 114 is operated, an imaging instruction signal is input to the controller 101 so that control over the shooting operation is performed through the controller 101. This release switch 114 has two level switch positions based on pressures of pressing down by a user. When the first level position (SW1 ON) is detected, a lock operation is performed on camera settings including white balance, photometry, and AF. When the second-level position (SW2 ON) is detected, an operation for acquiring an image signal of a subject is performed.

The power switch 112 is an operating member configured to receive an instruction to power on (start-up instruction) and an instruction to power off the imaging apparatus 100 from a user. In response to a power on or power off operation performed by a user on the power switch 112, the power switch 112 outputs a signal giving an instruction to power on (start up) or power off to the controller 101.

The zoom switch 113 is an operating member configured to receive an instruction to change the focal length of the image-forming optical system 105 in the imaging apparatus 100 from a user. In response to the operation performed thereon by a user, the zoom switch 113 outputs a signal giving an instruction to change the focal length to the controller 101. The controller 101, in response to the instruction to change the focal length, controls the image-forming optical system 105 through the lens drive unit 131 to change the focal length. This changes the optical zoom magnification. Although the zoom switch 113 according to this embodiment has two switches for optical zoom up 113a and optical zoom down 113b, the configuration of the zoom switch 113 is not limited thereto.

The mode switch 118 is an operating member configured to receive an instruction to switch the shooting mode among various modes of the imaging apparatus 100 in accordance with a user's operation. A user may operate to input a mode switching signal to the controller 101 to switch the shooting mode. Examples of shooting modes in response to shooting styles include a mode for shooting by performing a remote manipulation through an external apparatus 160 and a mode for shooting by operating various operating units included in the imaging apparatus 100 by using the EVF 150. It should be noted that the imaging apparatus may have a still image shooting mode and a moving image shooting mode as shooting modes based on a recorded image.

A photometry control unit 132 is a control unit configured to perform an automatic exposure control in response to an instruction from the controller 101 and to perform photometry processing by using an image signal acquired from the image pickup device 106 and to output the photometry result to the controller 101.

An example of basic photometry processing will be described. Luminance signals occurring in pixels on a light receiving surface of the image pickup device 106 undergo A/D conversion in the controller 101 to be 8-bit digital signals. In this case, the term "luminance signal" refers to an image signal acquired for photometry. In addition to this, an effective F number indicating a luminance of the image-forming optical system 105 is corrected, and variations among sensor output signals are corrected (level gain adjustment). In addition, photometry correction is performed based on information transmitted from the image-forming optical system 105. Finally, a luminance signal value for image sensing field can be acquired. An optimum exposure of the camera is computed based of these pieces of information. By optimally controlling the shutter speed of the camera and an aperture of the image-forming optical system 105 through the controller 101, optimum exposure can be realized.

A shutter 133 is configured to adjust the exposure time to control light quantity obtained by the image pickup device 106 and may be a focal plane shutter, a lens shutter, or an electronic shutter configured to control light quantity obtained electronically by the image pickup device.

These image-forming optical system 105, image pickup device 106, image pickup device control unit 107, lens drive unit 131, focal point control unit 119, release switch 114, shutter 133, photometry control unit 132, and zoom switch 113 configure an imaging unit.

The image processing unit 108 performs gamma conversion, color space conversion, and image processes such as white balance, AE, flash correction on 10-bit digital signals output from the image pickup device 106 and having undergone AD conversion by the image pickup device control unit 107. The image processing unit 108 is configured to convert an image signal having undergone image processes to an 8-bit digital signal in a YUV (4:2:2) format and outputs this signal.

The display control unit 111 is a control unit configured to control an image to be displayed on the display unit 154 of the EVF and is configured to generate a display image signal to be output to the display unit 154 based on an image signal from the image pickup device 106 in a case where a connection of the finder is detected by a finder connection detecting unit 115. The display unit 154 is configured to display an image based on a display signal obtained from the display control unit 111 via a connector. More specifically, the display control unit 111 is configured to receive YUV digital image data transferred from the image processing unit 108 or YUV digital image data acquired by performing JPEG decompression on an image file in the data storage unit 104. The YUV digital image data is converted to RGB digital signal, which is then output to the display unit 154 of the EVF 150. If an instruction to power on is input via the power switch 112, a display preparation instruction is input to the display control unit 111 through the controller 101. The display control unit 111 in response to the display preparation instruction is configured to perform a preparation for displaying an image based on a signal obtained by capturing an image with the image pickup device 106. When the preparation is completed, the image is displayed on the display unit 154 for live view display.

The display control unit 111 includes the finder connection detecting unit 115 configured to detect presence/absence of a connection of the EVF 150. The finder connection detecting unit 115 detects a connection of the EVF 150 by receiving a detection signal from the EVF 150 via the connector 120.

The connector 120 is a connection unit of the imaging apparatus 100 for connection with the EVF 150 and functions as an interface unit for connection with the connector 151 of the EVF 150. Via the connector 120 of the imaging apparatus 100 and the connector 151 of the EVF 150, information for display on the display unit 154 of the EVF 150, such as a display signal from the imaging apparatus 100 or a display signal request signal from the EVF 150, is communicated.

A battery 116 may be a rechargeable secondary battery or may be a primary battery that is not rechargeable such as a dry cell and is configured to supply electric power to the DC/DC converter 117. Any other power supply device may be applied if it can supply electric power.

The DC/DC converter 117 is configured to perform boosting of voltage and regulation by receiving power supply from the battery 116. Thus, the DC/DC converter 117 generates a plurality of power supplies so that power of voltage for devices such as the controller 101 can be supplied thereto. The DC/DC converter 117 is capable of controlling start/stop of the voltage supplies in accordance with a control signal from the controller 101.

A first notification unit 140 and a second notification unit 141 are configured to notify a user of information regarding a focal length. According to this embodiment, the first notification unit 140 and the second notification unit 141 are light emitting units configured to emit light by using light emitting diodes (LEDs). They may be a display device such as a liquid crystal display or a sound production unit configured to produce sound by using an audio device. Information excluding information regarding a focal length, such as information regarding ON/OFF of power supply and various error message information may be notified to a user. The first notification unit 140 and the second notification unit 141 apply a notification method controlled by the controller 101. In other words, the controller 101 also functions as a notification control unit configured to control notifications by the first and second notification units 140 and 141.

The first notification unit 140 is configured to notify mainly a subject of information regarding a focal length and is placed in neighborhood (which is called a side of the image-forming optical system) of a side on which light of the image-forming optical system 105 is incident. On the other hand, the second notification unit 141 is configured to notify mainly a photographer of information regarding a focal length and is placed in neighborhood (a side of the EVF attaching/detaching area) of the connector 120 of the EVF 150.

The data communication unit 109 is configured to communicate in a wired or wireless manner with the external apparatus 160 for remote control over the imaging apparatus 100. In a case where the external apparatus 160 has a display unit 161, a photographer may perform a shooting operation by checking a live view image, in the same manner as that with the display unit 154 of the EVF 150. The external apparatus 160 is a different electronic apparatus from the imaging apparatus 100 and may be a smart phone. The display unit 161 of the external apparatus 160 can be controlled by the display control unit 111, like the display unit 154 of the EVF 150. When an instruction to power on is input from the power switch 112 or when connection between the imaging apparatus 100 and the external apparatus 160 is established, a display preparation instruction is input to the display control unit 111 through the controller 101. When the display preparation instruction is input, the display control unit 111 performs a preparation for displaying an image based on a signal captured by the image pickup device 106. After completion of the preparation, the image is displayed on the display unit 161 for live view display.

The connector 110 is a connector used for connecting the external apparatus 160 to the imaging apparatus 100 in a wired manner.

Next, components of the EVF 150 will be described.

The connector 151 is a connection unit of the EVF 150 for connection with the imaging apparatus 100 and is an interface unit to be connected with the connector 120 of the imaging apparatus 100.

The eye approach detecting unit 152 is a detecting unit such as an eye sensor for detecting an approach of the eye of a user looking into the EVF 150.

The display unit 154 is configured to display an image based on a display signal from the display control unit 111 for display of a live view image and may include, for example, a small liquid crystal display (LCD) or an organic electroluminescence (EL) display. The display unit 154 further has a function to notify a photographer of a state of the imaging apparatus 100, such as information regarding a focal length.

The controller 155 is a control unit connected to the connector 151, the eye approach detecting unit 152, and the display unit 154 of the EVF 150 for overall control of the EVF 150.

Next, a flow of still image shooting by using the EVF 150 to be performed by the imaging apparatus will schematically be described. Light passing through the image-forming optical system 105 forms an image on an image plane (light receiving surface) of the image pickup device 106 so that a live view image based on the image signal is displayed on the display unit 154 of the EVF 150.

A photographer may half press the release switch 114 to turn on the SW1 so that the photometry control unit 132 and the controller 101 set exposure conditions such as a shutter speed and an aperture value. The focal point control unit 119 and the controller 101 execute a focal point adjustment process.

When a photographer fully presses the release switch 114, the SW2 is turned on so that subject light gathered by the image-forming optical system 105 undergoes light quantity control by the shutter 133, and then, as a subject image, undergoes photoelectric conversion processing by the image pickup device 106, and the image signal is output. After that, the image signal undergoes an image signal process by the image processing unit 108 so that a signal representing a captured still image is generated. The display unit 154 of the EVF 150 displays the captured still image.

FIG. 3 is a flowchart relating to a start-up process according to this embodiment and illustrating a flow which changes the notification method using the notification units 140 and 141 based on a focal length and which changes the focal length on which the notification method is based in accordance with whether the EVF 150 is connected or not. Notification examples given by the notification units 140 and 141 and display examples presented by the display units 154 and 161 according to this embodiment will be described with reference to FIGS. 4A to 4H.

First, in step S300, a user presses the power switch 112, and the controller 101 in the imaging apparatus 100 detects that the power supply is turned on. When it is detected that the power supply is turned on, the DC/DC converter 117 supplies power to the components within the imaging apparatus 100. Then, the imaging apparatus 100 is powered on and is instructed to start up the imaging apparatus 100.

Next, in step S301, the finder connection detecting unit 115 detects whether the EVF 150 is connected thereto or not. In a case where it is detected that the EVF 150 is connected thereto, the processing moves to step S302. In a case where it is not detected that the EVF 150 is connected, the processing moves to step S306.

The case where the EVF 150 is connected and the processing moves to step S302 corresponds to the connection configuration illustrated in FIGS. 1A and 1B. In this case, a user may often capture an image by looking into the EVF 150. On the other hand, the case where the EVF 150 is not connected and the processing moves to step S306 corresponds to the connection configuration illustrated in FIG. 1C. In this case, a user may often capture an image by using the external apparatus 160 instead of the EVF 150. In other words, the case where the processing moves to step S302 is assumed to cause less shaking, compared with the case where the processing moves to step S306.

In step S302, the controller 101 requests a currently set lens position to the lens drive unit 131 and determines whether the focal length depending on the set lens position is equal to or higher than a first threshold value. In this case, the currently set lens position corresponds to a position at which the lens is to be placed immediately after the start up. If the lens position is changed in step S309, which will be described below, the currently set lens position is different from the current position. If the lens position is not changed upon start-up, the current position and the set position match. The first threshold value according to this embodiment is a focal length of 400 mm.

Figure 4A:
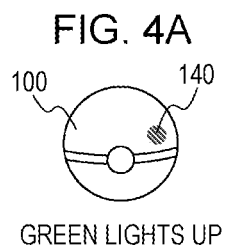
FIGS. 4A to 4H illustrate warning indications displayed by an electronic apparatus according to an embodiment of the present invention.
Figure 4B:
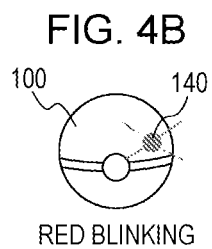
Figure 4C:
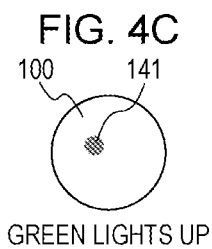
Figure 4D:
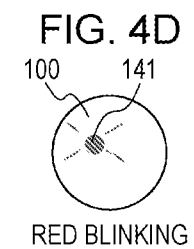

If it is determined in step S302 that the focal length is equal to or higher than the first threshold value, the processing moves to step S303. The controller 101 in the imaging apparatus 100 then controls the second notification unit 141 in the neighborhood of the EVF 150 to perform red blinking indication (warning notification), as illustrated in FIG. 4D. The red blinking indication by the second notification unit 141 can notify a user of a long focal length. The notified user can recognize that the set focal length liable to cause shaking because of a narrower angle of view. Therefore, the user can reset the focal length as required.

On the other hand, if it is determined in step S302 that the focal length is lower than the first threshold value, the processing moves to step S304. The controller 101 in the imaging apparatus 100 controls the second notification unit 141 in neighborhood of the EVF 150 to display a green light (no-warning notification) as illustrated in FIG. 4C. When the second notification unit 141 displays a green light, a user can be notified that the focal length is short. The user received the notification recognizes that the focal length which causes less shaking because of the wider angle of view is set. According to this embodiment, the color to be displayed and the display pattern (light up, blink, light out) are changed in accordance with whether the focal length is equal to or higher than the first threshold value. Thus, whether the focal length is long or not can be notified to a user.

In step S306, the controller 101 requests the currently set lens position to the lens drive unit 131, and determines whether the focal length depending on the set lens position is equal to or higher than a second threshold value. The second threshold value according to this embodiment is a focal length of 200 mm.

If the focal length is equal to or higher than the second threshold value in step S306, the processing moves to step S307. The controller 101 in imaging apparatus 100 then controls the first notification unit 140 in neighborhood of the image-forming optical system 105 to perform red blinking indication (warning notification), as illustrated in FIG. 4B. The red blinking indication by the first notification unit 140 can notify a user of a long focal length. The notified user can recognize that the set focal length is liable to cause shaking because of a narrower angle of view. Therefore, the user can reset the focal length as required.

On the other hand, if it is determined in step S306 that the focal length is lower than the second threshold value, the processing moves to step S308. The controller 101 in the imaging apparatus 100 controls the first notification unit 140 in neighborhood of the image-forming optical system 105 to display a green light (no-warning notification) as illustrated in FIG. 4A. When the first notification unit 140 displays a green light, a user can be notified that the focal length is short. The user received the notification recognizes that the focal length which causes less shaking because of the wider angle of view is set.

In step S309, the lens drive unit 131 in the imaging apparatus 100 drives the lens to the set lens position, which is detected in step S302 or step S306, so that the start up of the imaging apparatus 100 is completed. If there is no difference in the lens position between when the apparatus is powered on and when the apparatus is powered off, this step can be omitted.

In step S310, the imaging apparatus 100 determines whether it is in a mode enabling connection with the external apparatus 160 through the data communication unit 109 or not. If so, the imaging apparatus 100 establishes the connection with the external apparatus 160. The determination can be based on an operation performed on the mode switch 118, for example. In step S310, if it is determined that the imaging apparatus 100 is in a mode that it is connected with the external apparatus 160, the imaging apparatus 100 transmits a connection request to the external apparatus 160. When the external apparatus 160 receives the connection request after a user operates to power on the external apparatus 160 in step S320, the external apparatus 160 notifies the imaging apparatus 100 that it is connectable. Then in step S321, the external apparatus 160 and the imaging apparatus 100 are connected.

Figure 4E:
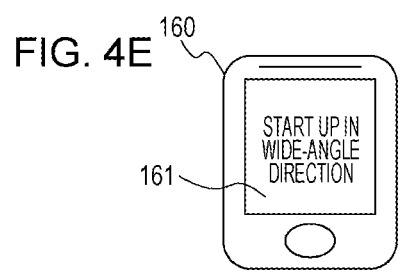
Figure 4F:
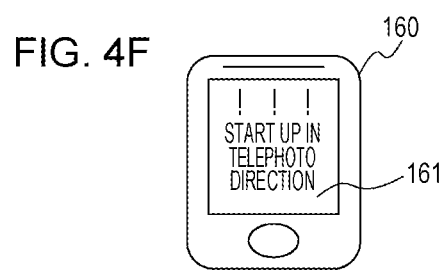
Figure 4G:
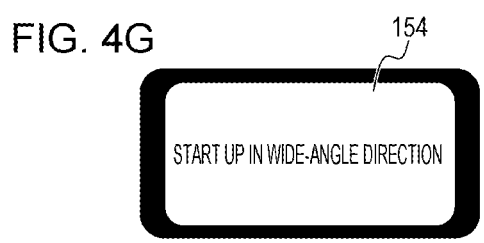

If the imaging apparatus 100 and the external apparatus 160 are connected in step S321, information regarding the focal length is displayed on the display unit 161 of the external apparatus 160 in step S322. Thus, a user is notified of the information regarding the focal length. In a case where the focal length immediately after the start up is equal to or higher than the first or second threshold value, which depends on the position of the lens driven in step S309, a user is notified that the focal length is long, as illustrated in FIG. 4F. If the current focal length is lower than the first or second threshold value, a user is notified that the focal length is short, as illustrated in FIG. 4E. After the notification completes in step S322, the imaging apparatus 100 and the external apparatus 160 complete the start-up process. Preparation for performing live view display by the display unit 161 in the external apparatus 160 is performed, and an image is captured in response to a shooting operation performed by a user.

On the other hand, if the imaging apparatus 100 is in a mode that it is not connected with the external apparatus 160 and that image-capturing is performed by using the EVF 150, the start-up process is terminated in step S310. If the start-up process is terminated, preparation for performing the live view display by the display unit 154 in the EVF 150 is performed, and an image is captured in response to a shooting operation performed by a user.

As described above, according to this embodiment, by notify determining whether the warning notification is given or not through the notification unit prior to start up of the imaging apparatus, a user is notified of a result of determination on whether or not the focal length is equal to or higher than a threshold value, which is information regarding the focal length. Thus, the user can recognize whether the focal length is relatively long or not before the imaging apparatus starts up (before completion of the display preparation on the display unit of the EVF or the external apparatus). If the imaging apparatus is capable of receiving an operation for changing the focal length before start up, a user can change the focal length without waiting for the start up, resulting in enhanced usability. Particularly, in a case where an external apparatus is used for image capturing, it takes time equal to a period of time for connection between the external apparatus and the imaging apparatus for a user to recognize the set focal length. However, according to this embodiment, whether the focal length is relatively long or not can be advantageously recognized before completion of the connection.

In addition, the threshold values (first threshold value and second threshold value) for determining whether a warning notification is to be given or not can be changed in accordance with the presence/absence of the connection with the EVF 150. Thus, the user interface display depending on the focal length can be controlled.

In view of an influence of shaking based on the shooting style with a digital camera, the inventor of the present invention focuses on different influences of shaking of the digital camera between a case where the digital camera is held by one hand for shooting and a case where shooting is performed by looking into a finder provided in the digital camera. For example, the former case corresponds to a style in which the digital camera is held by one hand for framing while checking a live view image captured by the digital camera on a smart phone held by the other hand. On the other hand, the latter case corresponds to a style in which the digital camera is held by both hands for image-capturing by looking into the finder provided in the digital camera. Generally, this finder-shooting style results in less influence of shaking of the digital camera. Accordingly, by setting the first threshold value higher than the second threshold value, it is possible to set a higher threshold value for giving a warning display when assuming image-capturing by a style which causes less shaking than a threshold value for giving a warning display when assuming image-capturing by a style which is liable to cause shaking. Thus, user interface display suitable for image-capturing style can be provided. Therefore, the problem that, by implementing the notification method optimized for shooting in an image-capturing style by which shaking is liable to occur, a user is bothered by excessively frequent warning notifications during shooting in an image-capturing style which causes less shaking can be suppressed.

Although the focal length is notified according to this embodiment, the representation of the notification can be changed to any notification form depending on the focal length, such as camera shake warning, from which the same effect can be expected.

Figure 4H:
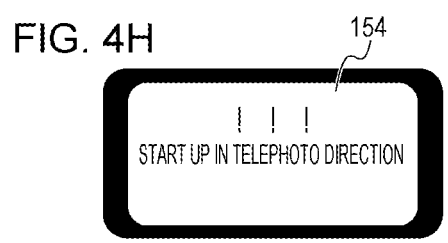

According to this embodiment, when the EVF 150 is connected, information regarding the focal length is notified to the second notification unit 141 in step S303 or S304. However, when the eye approach detecting unit 152 detects that a user is looking into the EVF 150, the information regarding the focal length may be displayed on the display unit 154 of the EVF 150. In this case, for example, the display may be as illustrated in FIG. 4H in step S303 or FIG. 4G in step S304.

Embodiment 2

Embodiment 2 provides an imaging apparatus configured to hold a focal length therein even when it is powered off. Embodiment 2 is different from Embodiment 1 in that the image-forming optical system is driven such that the focal length is lower than a threshold value in a case where the focal length is equal to or higher than the threshold value when the imaging apparatus is powered on and is powered off. With this configuration, even in a case where the imaging apparatus is instructed to be powered off while the focal length remains in the telephoto direction at the previous shooting, the next shooting can be started with the focal length having less influence of shaking, for example. The other points are the same as those of Embodiment 1 including the point that the threshold values can be changed in accordance with the result of the determination of the attaching/detaching of an EVF.

With reference to FIGS. 1A to 1C, FIG. 2, FIGS. 4A to 4H and FIGS. 5A and 5B, Embodiment 2 of the present invention will be described, omitting descriptions about parts overlapping those in Embodiment 1.

Because the configuration of this embodiment is the same as that of Embodiment 1, any repetitive descriptions will be omitted.

Figure 5B:
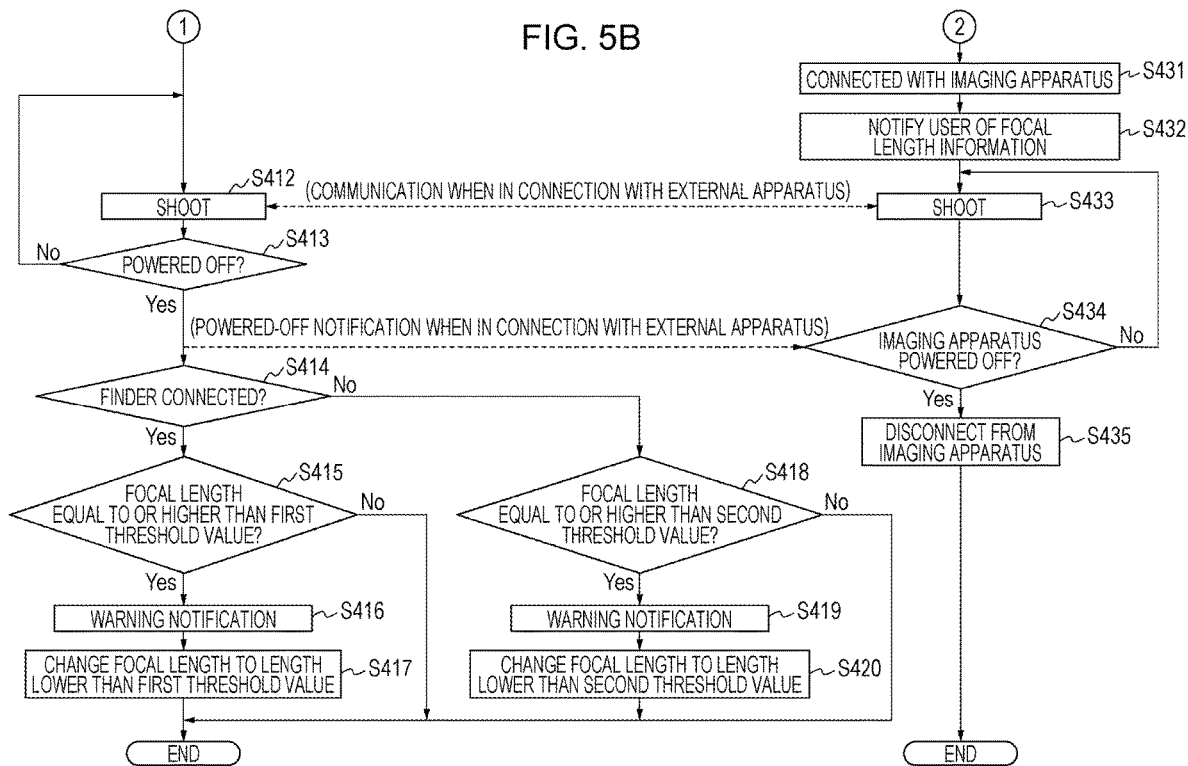

FIGS. 5A and 5B illustrate a flowchart according to Embodiment 2. The flowchart will be described with reference to FIGS. 4A to 4H illustrating warning indications according to this embodiment. The flowchart in FIGS. 5A and 5B illustrates a flow for changing the user interface display control relating to a focal length before the imaging apparatus 100 in FIG. 1 is started up based on whether the EVF 150 is connected with the imaging apparatus 100 or not. In addition to the user interface display control, the image-forming optical system is controlled to obtain a predetermined focal length or shorter when the imaging apparatus 100 is powered on and is powered off.

First, in step S400, like step S300 in Embodiment 1, when a user operates the power switch 112 to input an instruction to power on the imaging apparatus 100, the imaging apparatus is powered on and receives an instruction to start up.

Next, in step S401, the finder connection detecting unit 115 detects whether the EVF 150 is connected thereto or not. If so, the processing moves to step S402. If not, the processing moves to step S406.

If it is determined that the EVF 150 is connected thereto, the controller 101 in step S402 determines whether the focal length is equal to or higher than the first threshold value or not. If it is determined in step S402 that the focal length is equal to or higher than the first threshold value, the processing moves to step S403 where it is controlled such that a warning notification is to be given by using the second notification unit 141. Then, the processing moves to step S404. The processing in steps S400 to 403 is the same as the processing in steps S300 to 303 according to Embodiment 1.

In step S404, the lens drive unit 131 controls the image-forming optical system 105 such that the focal length is lower than the first threshold value. The processing then moves to step S405. In step S405, the controller 101 controls to give no-warning notification by using the second notification unit 141 as illustrated in FIG. 4C, like step S304.

If it is determined in step S402 that the focal length is lower than the first threshold value, the processing moves to step S405, without through steps S403 and 404, where no-warning notification is given by using the second notification unit 141.

On the other hand, if it is determined that the EVF 150 is not connected thereto, the controller 101 in step S406 determines whether the focal length is equal to or higher than the second threshold value or not. If the focal length is equal to or higher than the second threshold value in step S406, the processing moves to step S407 where it is controlled to give a warning notification by using the first notification unit 140. Then processing then moves to step S408. The processing in steps S406 and S407 is the same as the processing in steps S306 and S307 according to Embodiment 1.

In step S408, the lens drive unit 131 controls the image-forming optical system 105 such that the focal length is lower than the second threshold value. The processing then moves to step S409. In step S409, the controller 101 in the imaging apparatus 100 controls to give a no-warning notification by using the first notification unit 141, as illustrated in FIG. 4A.

If it is determined in step S406 that the focal length is lower than the second threshold value, the processing moves to step S409 without through steps S407 and S408, and it is controlled such that a no-warning notification is given by using the first notification unit 140.

After a no-warning notification is given in step S405 or S409, the processing moves to step S410 where the imaging apparatus is started up, like step S309.

In step S411, like step S310, the imaging apparatus 100 determines whether it is in a mode enabling connection with the external apparatus 160 through the data communication unit 109 or not. If so, the imaging apparatus 100 and the external apparatus 160 are connected in step S431. The external apparatus 160 in step S432 informs the display unit 161 in the external apparatus 160 of that the focal length is in the wide-angle direction, as illustrated in FIG. 4E.

In step S412, a user may perform a shooting operation by using the zoom switch 113, the release switch 114, and the mode switch 118, for example. During the shooting operation, the optical zoom magnification may be changed with the zoom switch 113, and the focal length may be changed from that upon start up of the imaging apparatus 100. In a case where the imaging apparatus 100 is connected with the external apparatus 160 in step S411, information for image-capturing processing is communicated between the external apparatus 160 and the imaging apparatus 100. In step S433, a process synchronized with the imaging apparatus is performed in accordance with the shooting operation in step S412. The synchronized process may include saving a captured image in the external apparatus 160, for example.

In step S413, the controller 101 in the imaging apparatus 100 determines whether a user presses down the power switch 112 to give an instruction to terminate the power supply (power off) or not. If it is determined that the termination of the power supply has not been instructed, the capturing processing continues in step S413. On the other hand, if it is determined that the termination of the power supply has been instructed, the processing moves to step S414. The termination processing of the imaging apparatus 100 starts. If the imaging apparatus 100 is connected with the external apparatus 160 here, the controller 101 in the imaging apparatus 100 notifies the external apparatus 160 that the termination processing of the imaging apparatus 100 is started.

If the external apparatus 160 in step S434 receives the notification of the start of the termination processing of the imaging apparatus 100, the processing moves to step S435. If not, the processing returns to step S433 where the capturing processing continues.

In step S435, the external apparatus 160 disconnects from the imaging apparatus 100, and the flow for capturing control by the external apparatus 160 ends.

In step S414, the finder connection detecting unit 115 detects whether the EVF 150 is connected or not, like step S401. If the connection is detected, the processing moves to step S415. If not, the processing moves to step S418.

If the connection with the EVF 150 is detected, the controller 101 in step S415 determines whether the currently set focal length is equal to or higher than the first threshold value or not, like step S402. If it is determined that the focal length is equal to or higher than the first threshold value, the processing moves to step S416 where it is controlled such that a warning notification is given by using the second notification unit 141, like step S403. The processing then moves to step S417.

In step S417, like step S404, the lens drive unit 131 in the imaging apparatus 100 controls the image-forming optical system 105 such that the focal length is lower than the first threshold value. The termination processing of the imaging apparatus 100 is completed, and the flow ends.

If the focal length is lower than the first threshold value in step S415, the termination processing of the imaging apparatus 100 is performed without through steps S416 and S417. The flow then ends.

On the other hand, if it is determined that the EVF 150 is not connected, the controller 101 in step S418 determines whether the focal length is equal to or higher than the second threshold value or not.

If the focal length is equal to or higher than the second threshold value in step S418, the processing moves to step S419 where it is controlled such that a warning notification is given by using the first notification unit 140, like step S407. The processing then moves to step S420.

In step S420, the lens drive unit 131 controls the image-forming optical system 105 such that the focal length is lower than the second threshold value. The termination processing of the imaging apparatus 100 is completed, and the flow ends.

If the focal length is lower than the second threshold value in step S418, the termination processing of the imaging apparatus 100 is performed without through steps S419 and S420, and the flow ends.

According to this embodiment, the focal length is changed to be lower than the threshold value before shooting starts. Thus, the imaging apparatus can be started up with the focal length enabling easier framing of a subject irrespective of the focal length set when the start-up instruction is input. The focal length is changed to be lower than the threshold value before termination of power supply upon termination of the imaging apparatus. This can reduce the frequency of performance of step S404 upon start up. Thus, the time for the start up can be reduced. Although, according to this embodiment, the focal length is changed to be lower than the threshold value upon both start up and termination of power supply, the focal length may be change upon one of the start up and the termination of power supply. In this case, when it is performed upon start up of the imaging apparatus, the imaging apparatus can be started up with the focal length lower than the threshold value even though the imaging apparatus can change the focal length during termination of power supply. If it is performed during the termination and the focal length is changed during termination of power supply, there is a possibility that the imaging apparatus is started up with a focal length equal to or higher than the threshold value. However, the time for the start up is not to be longer than that in step S404. In a case where the imaging apparatus cannot change the focal length and focal length set value during termination of power supply, the focal length can be changed one of start up or termination, which provides the same effect as that of the changes of the focal length at both the start up and the termination. In this case, the control may be performed during the termination so that the time for the start up can be reduced.

There is a possibility that the EVF may be detached or be attached during termination of power supply. Therefore, the focal length after changed in step S417 may be equal to the focal length changed in step S420. In other words, the power supply can be terminated after the focal length is changed to a first focal length irrespective of the presence/absence of the connection of the EVF. In this case, the first focal length is lower than the second threshold value. During termination of the power supply, an equal threshold value may be used to determine the necessity of a warning notification and the necessity of a change of the focal length, irrespective of the presence/absence of the connection of the EVF. In this case, the threshold value to be used may be lower than the second threshold value.

Embodiment 3

According to Embodiment 3, an example will be described in which the focal length is notified to a user in an imaging apparatus having an outer appearance which does not change even when the focal length is changed and the focal length is held even when the power supply is terminated.

In an imaging apparatus having an outer appearance which does not change even when the focal length is changed, such as an imaging apparatus having an inner-zoom type optical system, a user (subject) who does not look at a control screen for the EVF or an external apparatus does not even know whether an image-capturing operation is to be performed in the telephoto direction or in the wide-angle direction. In addition, even a user (operator) who looks at a control screen for the EVF or an external apparatus does not know the currently set focal length until the start up of the imaging apparatus completes and a preview screen or a focal length is displayed on the EVF or the external apparatus. Accordingly, an imaging apparatus according to this embodiment includes a notification unit which starts up more quickly than a control screen for the EVF or an external apparatus, wherein the notification method is changed in accordance with the focal length so that information regarding the focal length can be notified to a user.

Because the configuration of this embodiment is the same as those of Embodiments 1 and 2, any repetitive descriptions will be omitted. The first and second notification units 140 and 141 are light emitting units who can start up quickly, and the focal length can be changed between a first focal length and a second focal length. The zoom switch 113 can support both the first focal length and the second focal length. The focal length of the optical system is changed to the first focal length when one of the two zoom switches illustrated in FIG. 1 is pressed down and is changed to the second focal length when the other one is pressed down.

The controller 101 can detect the pressed state of the zoom switch 113 and changes the light emitting color of the first and second notification units 140, 141 between a case where the switch corresponding to the first focal length is pressed down and a case where the switch corresponding to the second focal length is pressed down. Between the first focal length and the second focal length, the longer focal length may be notified by light with warm color such as red while the shorter focal length may be notified by light with cold color such as blue or green.

According to this embodiment, information regarding the focal length is notified to a user immediately after the imaging apparatus is powered on. Therefore, an instruction to change the set value for the focal length can be input before the imaging apparatus starts up. Such an imaging apparatus having a focal length which can be changed by a user's operation during termination of power supply to or before start up of the imaging apparatus and having a lens position which can mechanically be changed in accordance with a button operation can provide particularly great effects because a desired focal length can be set before the start-up.

VARIATION EXAMPLES

FIGS. 6A to 6C and FIGS. 7A to 7C illustrate outer appearances of variation examples of the imaging apparatus 100 and EVF 150. Like symbols in FIGS. 6A to 6C and FIGS. 7A to 7C refer to like parts in FIG. 1.

Figure 6A:
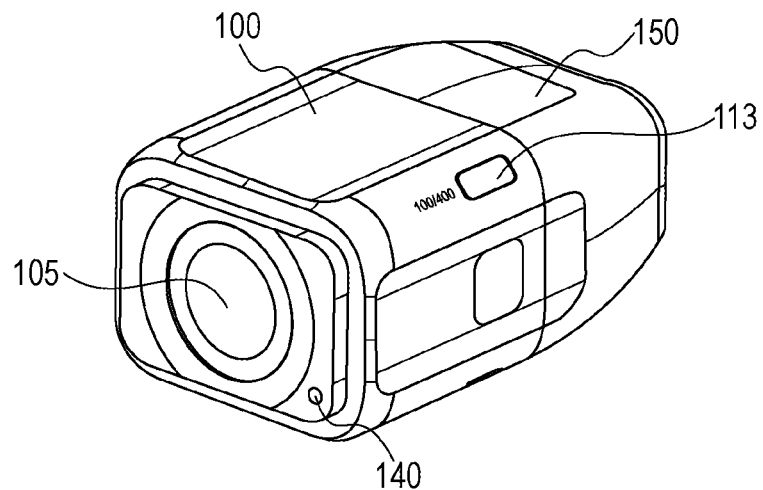
FIGS. 6A to 6C illustrate outer appearances of an imaging apparatus and an electronic viewfinder according to a variation example.
Figure 6B:
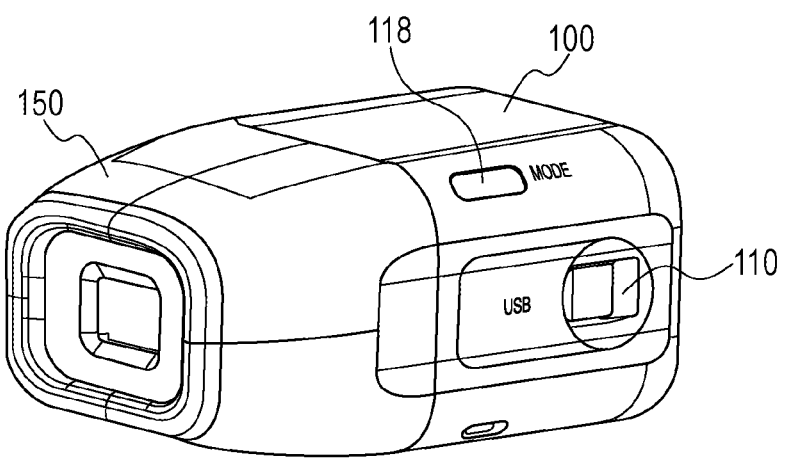
Figure 6C:
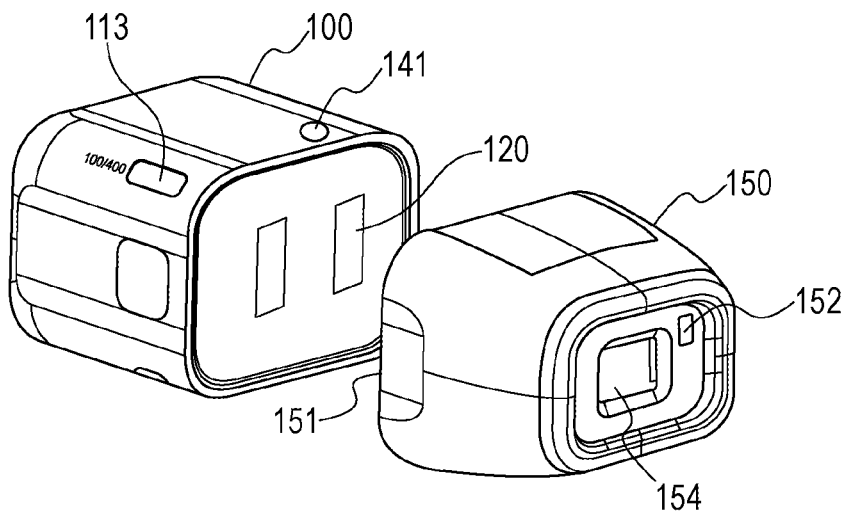

The imaging apparatus 100 illustrated in FIGS. 6A to 6C has one zoom switch 113. When the zoom switch 113 is pressed down, the focal length is changed sequentially. The imaging apparatus 100 further includes a power/release switch 200 which can be used as both a release switch and a power switch. The power/release switch 200 can function as a power switch or can function as a release switch in accordance with the pressed time period.

Figure 7A:
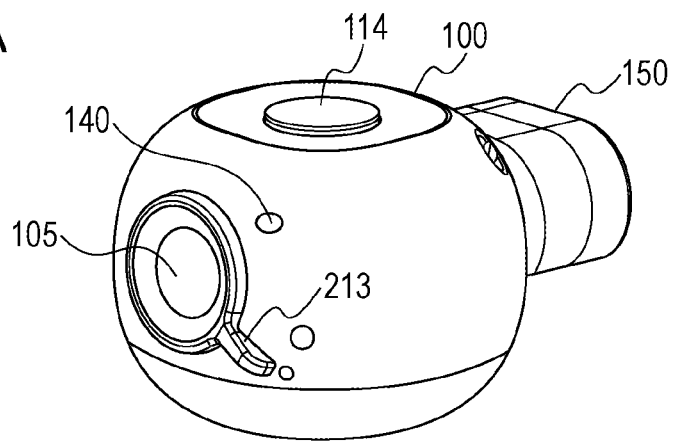
FIGS. 7A to 7C illustrate outer appearances of an imaging apparatus and an electronic viewfinder according to a variation example.
Figure 7B:
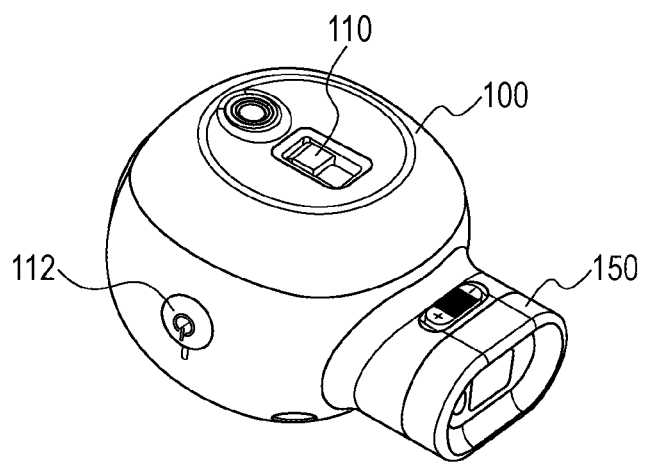
Figure 7C:
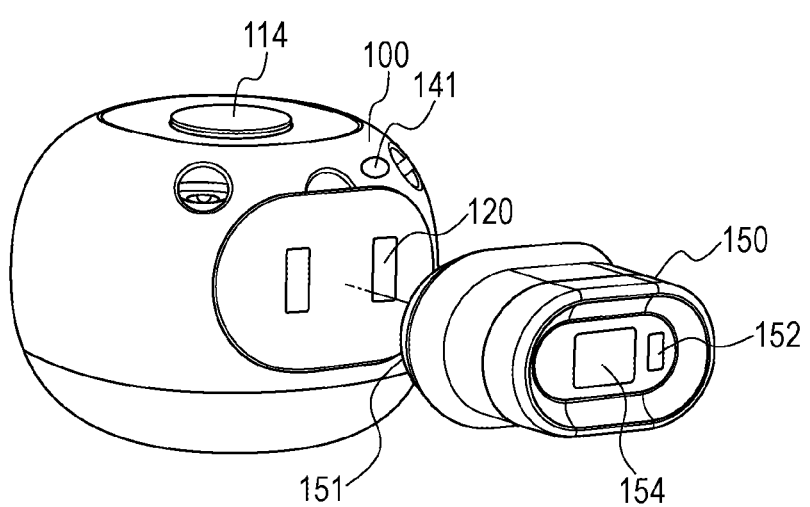

On the other hand, the imaging apparatus 100 illustrated in FIGS. 7A to 7C includes a zoom lever 213 functioning as a zoom switch. The optical system can have a plurality of focal lengths, and the zoom lever can rotate to an angle corresponding to each of the focal lengths that the optical system can have. The focal length can be changed in accordance with the rotated position.

According to Embodiments 1 and 2, in order to acquire the currently set focal length for changing the focal length, the set lens position is obtained from the lens drive unit, the focal length is acquired based on the obtained lens position. However, the method for acquiring the focal length is not limited thereto. For example, like Embodiment 3, the focal length can be acquired based on the pressed state of the zoom switch 113. This form is not limited to the zoom switch 113, but the set focal length may be acquired based on the angle of the zoom lever 213 in the imaging apparatus illustrated in FIGS. 7A to 7C.

In a case where the imaging apparatus includes an image-forming optical system having a focal length which is changeable even when the imaging apparatus is powered off, the controller can use a sub-processor that starts up early for quick acquisition of the focal length.

Having described the example having the first threshold value and the second threshold value according to Embodiments 1 to 2, three or more threshold values can be provided. For example, in an imaging apparatus having a first mode for capturing an image by looking into an EVF, a second mode for capturing an image by using an external apparatus and by holding the imaging apparatus by hand, and a third mode for capturing an image by fixing a stationary body to a tripod or placing a stationary body on a table, for example, the threshold value may be changed in accordance with the selected mode. Although this type of imaging apparatus assumes a small influence of shaking when the third mode is set, it may be difficult for a user to finely adjust the angle of view. Therefore, the threshold value may be set between the threshold value in the first mode and the threshold value in the second mode. The mode can be selected in accordance with a user's operation or may be automatically determined by the imaging apparatus. For the automatic determination, for example, the first mode is distinguished when the EVF is attached. The second mode and the third mode can automatically distinguished based on whether a stand for mounting included in the imaging apparatus is stored or not.

Although, according to Embodiments 1 and 2, both the light emitting color and light emitting pattern are changed in accordance with the focal length, one of them may be changed.

The start-up processing and termination processing of the imaging apparatus may include a process in addition to the changing the focal length and the notification of information regarding the focal length, although not described in the flow according to Embodiments 1 and 2. For example, the notification unit may have a light emitting unit and a sound production unit, and information regarding the focal length may be notified to a user by the light emitting unit, and information regarding powering on and off may be notified to a user by audio from the sound production unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-254238, filed Dec. 28, 2017, which is hereby incorporated by reference herein in its entirety.

What is claimed is:

1. An optical apparatus comprising:
an image-forming optical system with a changeable focal length;
an image pickup device configured to capture an image formed by the image-forming optical system and to output an image signal; and
at least one processor or circuit programmed to function as:
a control unit configured to output a start-up instruction in response to a power-on operation;
a display control unit configured to control a display unit configured to display an image based on the image signal; and
a notification control unit configured to control a notification unit provided separately from the display unit and configured to notify a user of information regarding the focal length of the image-forming optical system in response to the start-up instruction,
wherein, based on the focal length, the notification control unit changes a notification method of notifying the user of the information regarding the focal length by the notification unit in response to the start-up instruction.

2. The optical apparatus according to claim 1, wherein the notification control unit controls the notification method so that the notification unit notifies the information regarding the focal length by a first notification method in a case where the focal length is equal to or higher than a threshold value and the notification unit notifies the information regarding the focal length by a second notification method in a case where the focal length is lower than the threshold value.

3. The optical apparatus according to claim 2, wherein the at least one processor or circuit further functions as
a detecting unit configured to detect attaching/detaching of an electronic viewfinder, the electronic viewfinder being configured to display an image based on the image signal, and
wherein the notification control unit
changes the threshold value based on the focal length and a result of a determination of the attaching/detaching of the electronic viewfinder.

4. The optical apparatus according to claim 2, wherein the notification control unit causes the notification unit to give a warning notification in a case the notification unit notifies the information regarding the focal length by the first notification method.

5. The optical apparatus according to claim 1,
wherein the display control unit performs a preparation for display of an image based on the image signal on the display unit in response to the start-up instruction, and
wherein the notification control unit causes the notification unit to notify the user of information regarding the focal length before the preparation completes.

6. The optical apparatus according to claim 1, wherein the at least one processor or circuit further functions as
a detecting unit configured to detect attaching/detaching of an electronic viewfinder, the electronic viewfinder is being configured to display an image based on the image signal,
wherein the notification control unit
controls notification of information regarding the focal length by a first notification unit provided on a side of the image-forming optical system and a second notification unit provided on a side of an attaching/detaching area of the electronic viewfinder,
controls the first notification unit such that at least the first notification unit notifies the user of information regarding the focal length in a case where the detecting unit determines that the electronic viewfinder is not attached, and
controls the second notification unit such that at least the second notification unit notifies the user of information regarding the focal length in a case where it is determined that the electronic viewfinder is attached.

7. The optical apparatus according to claim 1, wherein the at least one processor or circuit further functions as
a detecting unit configured to detect attaching/detaching of an electronic viewfinder, the electronic viewfinder being configured to display an image based on the image signal; and
the display control unit configured to control information to be displayed on the electronic viewfinder, and
wherein, in a case where the display control unit receives from the electronic viewfinder a determination result indicating that a user is looking into the electronic viewfinder, the display control unit notifies information regarding the focal length on a display unit of the electronic viewfinder.

8. The optical apparatus according to claim 1,
wherein the notification unit has a light emitting unit, and
wherein the notification control unit changes at least one of a light emitting color and a light emitting pattern of the light emitting unit to change the notification method.

9. The optical apparatus according to claim 8, further comprising the notification unit.

10. The optical apparatus according to claim 1,
wherein the notification unit includes a sound production unit, and
wherein the notification control unit changes a sound produced by the sound production unit to change the notification method.

11. The optical apparatus according to claim 10, further comprising the notification unit.

12. The optical apparatus according to claim 1, further comprising:
a drive unit configured to drive the image-forming optical system,
wherein, in a case where the focal length is equal to or higher than a threshold value when the start-up instruction is input, the drive unit drives the image-forming optical system such that the focal length is lower than the threshold value.

13. The optical apparatus according to claim 1, further comprising:
a drive unit configured to drive the image-forming optical system,
wherein the control unit is configured to output a termination instruction in response to a powering off operation, and
wherein, in a case where the focal length is equal to or higher than a threshold value when the termination instruction is received, the drive unit drives the image-forming optical system such that the focal length is lower than the threshold value.

14. A control method for an optical apparatus, the optical apparatus including an image-forming optical system with a changeable focal length; and an image pickup device configured to capture an image formed by the image-forming optical system and to output an image signal, the method comprising:
outputting a start-up instruction in response to a power-on operation;
controlling a display unit configured to display an image based on the image signal to display the image; and
controlling a notification unit provided separately from the display unit to notify a user of information regarding the focal length of the image-forming optical system in response to the start-up instruction,
wherein a notification method of notifying the user of the information regarding the focal length by the notification unit in response to the start-up instruction is changed based on the focal length.

* * * * *